N. ST. FRANCIS.
SHOCK ABSORBER.
APPLICATION FILED JAN. 3, 1910.
966,868.
Patented Aug. 9, 1910.
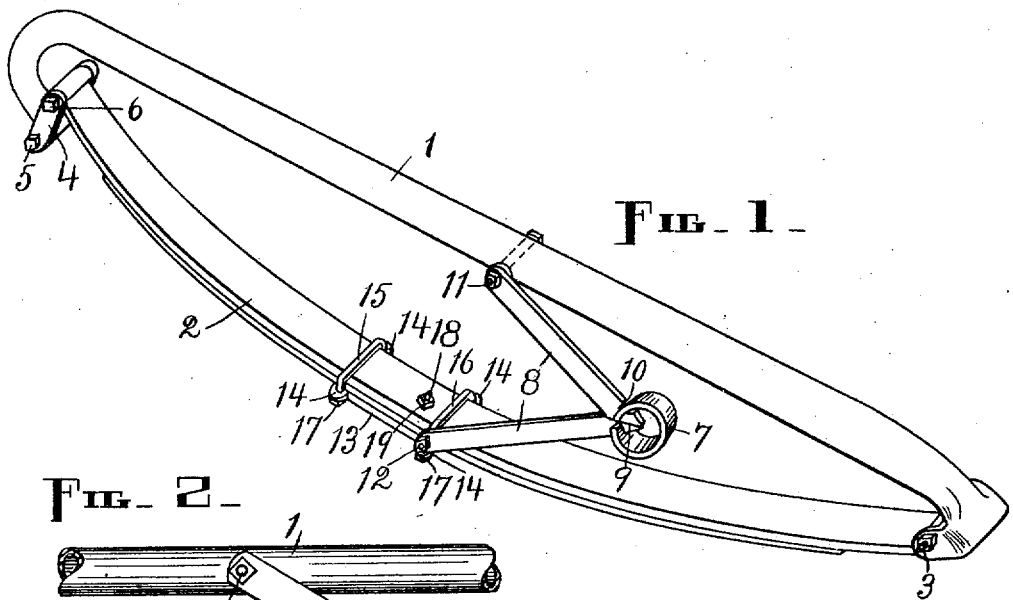
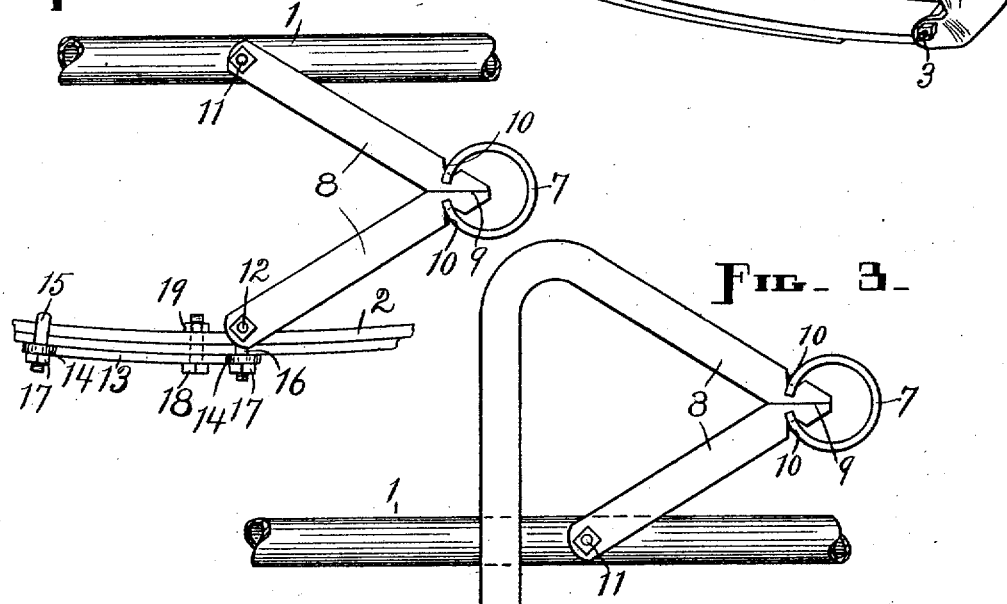
WITNESSES:
G. C. Fairbanks
Joseph Barr
INVENTOR.
Napoleon St. Francis,
BY
Webster & Co.,
ATTORNEYS.

UNITED STATES PATENT OFFICE.

NAPOLEON ST. FRANCIS, OF CHICOPEE FALLS, MASSACHUSETTS.

SHOCK-ABSORBER.

966,868.  Specification of Letters Patent.  Patented Aug. 9, 1910.

Application filed January 3, 1910. Serial No. 536,164.

*To all whom it may concern:*

Be it known that I, NAPOLEON ST. FRANCIS, a citizen of the United States of America, residing at Chicopee Falls, in the county of Hampden and State of Massachusetts, have invented a new and useful Shock-Absorber, of which the following is a specification.

My invention relates to improvements in what are commonly known as shock absorbers, that is, devices designed to take up or compensate for sudden and excessive strain to which the resilient supports of vehicles are subjected whenever obstacles are encountered or the road-ways are rough or uneven; and said invention consists essentially of a split-ring spring and a pair of angularly-arranged arms having contiguous or abutting terminals held in the grasp of said spring and adapted to have their opposite ends connected with compressible and expansible members, or members so arranged that they vibrate under their load, all as hereinafter set forth.

The object of my invention is to provide simple and inexpensive yet efficient means for relieving vehicle springs and the like from shock in either direction, or in other words from the shock of the upward rebound as well as that from the downward jolt of the load, to the end that such springs are saved from breakage and other injury and the comfort of riding resulting from the increased ease of motion is greatly enhanced.

Other objects will appear in the course of the following description.

I attain these objects by the means illustrated in the accompanying drawings, in which—

Figure 1 is a perspective view of a spring unit having a practical form of my invention incorporated therewith; Fig. 2, a side elevation of the shock absorber shown in the preceding view, with so much of the spring unit as is necessary for the connections, and, Fig. 3, a side elevation illustrating a modified form of the device.

Similar figures refer to similar parts throughout the several views.

Although my shock absorber is particularly useful for application beneath vehicle bodies, it is adaptable for bicycle and motor-cycle saddles, and any other resiliently-supported load-carrying device where a spring unit of the elliptic type or equivalent yielding support is employed and it is desired to absorb the shock to which such unit or support may be liable.

The two forms of my device herein shown and described are very simple, so also are their applications, and although entirely practical I do not intend to be unduly restricted to this disclosure, since more or less change may be made therein in matters of shape, size, means of connection, and minor details of construction. In line with this it may be well to note, too, that the device can be used with most if not all kinds of ordinary elliptic spring units or similar yielding supports which approach and recede and thereby decrease and increase the space between them, so that limitation to the particular spring unit herein appearing is not to be presumed.

The spring unit with which my shock absorber is illustrated, shown in full in Fig. 1 and fragments of which appear in Figs. 2 and 3, consists of a rigid top bar or tube 1, an elliptic spring 2 made up of two leaves and having one end pivoted at 3 to one end of said bar or tube, and a link 4 by means of which the opposite end of said spring is connected with the opposite end of the tube, said link being pivoted to the tube at 5 and to the spring at 6. These parts are old and well-known and function in the usual manner as yielding supporting means for a vehicle body, or, it might be, for a vehicle seat.

The shock absorber itself, as represented in the first two views, comprises a split-ring spring 7, and two arms 8 mitered at 9 and notched at 10—10 to receive the adjacent edges of the transversely cut spring. The notches 10 are cut in the outside edges of the arms 8 a short distance from the ends of the abutting or mitered edges of said arms, and the split part of the spring 7 fits into said notches and normally retains said mitered edges together so that the arms are caused to form an angle with each other, the construction preferably being such that said angle is acute. Sidewise movement on the part of the spring 7 is prevented by notching centrally the edges of the split part of said spring to receive the inner ends of the notches 10.

It will now be seen that this miter joint at 9 can be opened at either end, the arms 8 fulcruming at the end of said joint opposite that where it opens in each case, and that the more the joint opens the greater is the tension exerted on the arms by the spring 7. Thus it is that the spring 7 tends always to close the miter joint 9 whether the latter be opened by pressing the ends of the arms 8 which are opposite to such joint toward or away from each other, and does close the same after gradually checking, by reason of the increasing tension which said spring puts upon the mutually swinging arms when their state of rest is disturbed, the movement of said arms. The aforesaid state of rest obtains when the mitered edges of the arms abut throughout their entire lengths.

The ends of the arms 8 opposite the joint 9 are respectively connected pivotally with the tube 1 and the elliptic spring 2 intermediate of their ends, the upper arm being pivoted at 11 to said tube and the lower arm being pivoted at 12 to an anchorage device attached to said spring. Said anchorage device consists in the present case of a plate 13 having four laterally-extending ears 14, clips 15 and 16 adapted to embrace the spring 2 on top and at the sides and to pass through said ears and with the assistance of nuts 17 to hold said plate tightly against the underside of said spring, and a bolt 18 which passes upward through the plate and spring and has a nut 19 on its upper terminal to prevent any movement on the part of the device longitudinally of the spring. The pivot 12 is a lateral extension of the horizontal part of the clip 16.

From the foregoing it is clear that, when the tube 1 is borne down against the resiliency of the elliptic spring 2, the arms 8 are swung on their pivotal points 11 and 12 and open the joint 9 at the outer end against the resiliency of the split-ring spring 7, and that, upon the rebound caused by relieving said elliptic spring of its augmented strain or load, provided such rebound be sufficiently great as it usually is, said arms are again swung on their pivotal points and open said joint at its inner end against the resiliency of said spring 7, the latter serving in the first instance to relieve the spring 2 of part of its load and assist said spring in making its recovery, and in the second instance to protect the spring 2 and assist the parts to resume their normal positions and conditions.

Under the foregoing conditions incident to the spring unit or support hereinbefore described, the shock absorber acts at all times as a buffer for said unit or support and in conjunction therewith, eliminating practically all shock and jar and obviating all danger of injury or breakage to the main supporting spring, and materially increasing the ease with which one can ride when supported by these elements.

In the construction shown in the last view the same elements are used as before, but the upper arm 8 is here prolonged and bent downward to form a vertical or approximately vertical extension 20. The base of the extension 20 is mounted on the pivot 12, instead of the lower arm 8 being mounted on such pivot as in the first case, and said lower arm in this case is mounted on the pivot 11. The only difference in operation between the two constructions is that the miter joint 9 of the second opens at its inner end when the tube 1 is forced from its normal position toward the elliptic spring 2, and said joint opens at the outer end when said tube is forced from its normal position or beyond its normal position away from said spring, while the miter joint in the other case opens in the opposite manner in each instance. The results accruing from the two constructions are substantially the same.

This shock absorber is very compact, and can be applied with little difficulty to various kinds of yielding supports, advantages due to its simplicity of construction, few number of parts, and the peculiar characteristics of the split-ring spring. Furthermore, it should not be overlooked that this latter, the split-ring spring, is especially valuable for my purpose to which it is inherently and excedingly well adapted.

What I claim as my invention, and desire to secure by Letters Patent, is—

1. As a new article of manufacture, a shock absorber comprising two arms forming a miter joint at one end, and a resilient member clamped on to said arms at their mitered terminals and adapted to yield to permit said joint to open at either end.

2. As a new article of manufacture, a shock absorber comprising two arms arranged to form a miter joint at one end, and a split-ring spring, the mitered terminals of said arms being held between the transverse edges of said spring.

3. The combination, in a shock absorber, with a yielding support comprising members one of which is adapted to be moved toward and away from the other, of two arms arranged to form a miter joint at one end, a resilient member clamped on to said arms at their mitered terminals and adapted to yield to permit said joint to open at either end, and means to connect the terminals of said arms which are opposite to said joint respectively with the aforesaid members of said yielding support.

4. The combination, in a shock absorber, with a yielding support comprising members one of which is adapted to approach and recede from the other, of two arms arranged to form a miter joint at one end, and a split-ring spring, the mitered terminals of said arms being held between the transverse edges of said spring, and said arms having their terminals opposite said joint pivotally connected respectively with the aforesaid members of said yielding support at intermediate points.

NAPOLEON ST. FRANCIS.

Witnesses:
F. A. CUTTER,
A. C. FAIRBANKS.